US012693862B2

(12) United States Patent
Jung et al.

(10) Patent No.: US 12,693,862 B2
(45) Date of Patent: Jul. 28, 2026

(54) ASYNCHRONOUS SCHEDULNG AND EXECUTION OF DATA PORTION OPTIMIZATIONS

(71) Applicant: SAP SE, Walldorf (DE)

(72) Inventors: Philipp Jung, Heidelberg (DE); Klaus Otto Mueller, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/966,529

(22) Filed: Dec. 3, 2024

(65) Prior Publication Data

US 2026/0154080 A1     Jun. 4, 2026

(51) Int. Cl.
    *G06F 16/00*       (2019.01)
    *G06F 9/30*        (2018.01)
    *G06F 9/48*        (2006.01)

(52) U.S. Cl.
    CPC .......... *G06F 9/3009* (2013.01); *G06F 9/4818* (2013.01)

(58) Field of Classification Search
None
See application file for complete search history.

(56) References Cited

U.S. PATENT DOCUMENTS

| | | | | | |
|---|---|---|---|---|---|
| 9,207,919 | B2 * | 12/2015 | Diamos | ............... | G06F 9/45516 |
| 9,235,446 | B2 * | 1/2016 | Bruno | .................. | G06F 9/5066 |
| 9,665,630 | B1 * | 5/2017 | Bigman | ................. | G06F 3/061 |
| 9,996,389 | B2 * | 6/2018 | Caufield | ................. | G06F 11/34 |
| 11,023,311 | B2 * | 6/2021 | Datta | ................... | G06F 13/1668 |
| 11,232,090 | B2 * | 1/2022 | Eluri | ..................... | G06F 16/219 |
| 11,995,448 | B1 * | 5/2024 | Sodani | ................. | G06F 9/3877 |
| 12,093,254 | B1 * | 9/2024 | Kondiles | .......... | G06F 16/24537 |
| 2003/0115168 | A1 * | 6/2003 | Robison | ................. | G06F 16/23 |
| 2007/0266000 | A1 * | 11/2007 | Piedmonte | ............ | G06F 16/245 |
| 2013/0346988 | A1 * | 12/2013 | Bruno | ................... | G06F 9/5066 |
| | | | | | 718/102 |
| 2017/0213174 | A1 * | 7/2017 | Deshpande | .......... | G06Q 10/067 |
| 2018/0246762 | A1 * | 8/2018 | Tarsa | ..................... | G06F 9/5083 |
| 2019/0087225 | A1 * | 3/2019 | Rozen | ..................... | G06F 9/505 |
| 2019/0228352 | A1 * | 7/2019 | Nayak | ..................... | G06F 9/546 |
| 2022/0050662 | A1 * | 2/2022 | Howard | ............. | G06F 13/1673 |
| 2023/0051639 | A1 * | 2/2023 | Helvey | ................. | G06F 16/27 |
| 2023/0120159 | A1 * | 4/2023 | Kapre | .............. | G06F 16/24561 |
| | | | | | 707/755 |
| 2023/0401217 | A1 * | 12/2023 | Arnold | .............. | G06F 16/24566 |
| 2024/0053993 | A1 * | 2/2024 | Mane | ................... | G06F 9/5027 |

(Continued)

*Primary Examiner* — Jean M Corrielus
(74) *Attorney, Agent, or Firm* — Buckley, Maschoff & Talwalkar LLC

(57)        ABSTRACT

A system includes determination, for each of a first set of data portions of a plurality of data portions, of a first respective one or more data portion optimizations, transmission of the first respective one or more data portion optimizations to an optimization queue, execution of a plurality of threads to retrieve data portion optimizations from the optimization queue and execute the retrieved data portion optimizations and, while at least one of the plurality of threads is retrieving data portion optimizations from the optimization queue and executing the retrieved data portion optimizations, determination of a second respective one or more data portion optimizations for each of a second set of data portions of the plurality of data portions, and transmission of the second respective one or more data portion optimizations to the optimization queue.

20 Claims, 6 Drawing Sheets

(56)                    References Cited

U.S. PATENT DOCUMENTS

| 2024/0078232 | A1* | 3/2024 | Arnold | G06F 16/24537 |
| 2024/0111774 | A1* | 4/2024 | Kondiles | G06F 16/24532 |
| 2024/0134858 | A1* | 4/2024 | Schieferstein | G06F 16/24549 |
| 2024/0241924 | A1* | 7/2024 | Zadeh | G06N 3/084 |
| 2024/0256128 | A1* | 8/2024 | Shveidel | G06F 3/061 |
| 2024/0330305 | A1* | 10/2024 | Kondiles | G06F 16/2456 |
| 2024/0362223 | A1* | 10/2024 | Lougovtsov | G06F 16/24542 |

* cited by examiner

155

| Data Portion | Optimization Type | Data Portion Size | TimeStamp | Status |
|---|---|---|---|---|
| P13413C12 | Reclaim Delta | .5MB | T3 | In-Progress |
| P41323C3 | Optimize Compression | .75MB | T8 | In-Progress |
| P83540C21 | Delta Merge | 4MB | T6 | Queued |
| P42300C8 | Delta Merge | 10MB | T2 | Queued |
| P38012C12 | Reclaim Delta | 12MB | T5 | Queued |
| P04199C43 | Delta Merge | 25MB | T1 | Queued |

*FIG. 3*

ASYNCHRONOUS SCHEDULNG AND EXECUTION OF DATA PORTION OPTIMIZATIONS

Conventional database systems store large amounts of data in the form of database tables. To maintain good system performance, a variety of optimizations are regularly applied to the stored data during system operation. Scheduling these optimizations is a complex task, since both over- and under-scheduling can lead to poor system performance, out-of-memory situations or even database unavailability.

Some database systems periodically analyze their database tables to determine whether optimizations should be applied thereto. During this detection phase, a list of tables to be optimized is determined. Next, one or more execution threads executes the determined optimizations. Once the last optimization of the list is executed, the detection phase is again executed.

To avoid conflicts, re-execution of the detection step must wait until a last-running optimization is complete. Optimizing a large database table may require several hours, during which time other tables which should be optimized remain unoptimized. Improved systems to efficiently detect needed data optimizations and execute the needed data optimizations in a resource-efficient manner are desired.

BRIEF DESCRIPTION OF THE DRAWINGS

FIG. 3 is a tabular representation of an optimization queue according to some embodiments.

DETAILED DESCRIPTION

The following description is provided to enable any person in the art to make and use the described embodiments. Various modifications, however, will remain readily-apparent to those in the art.

Embodiments provide improved data optimization by decoupling optimization detection from optimization execution. As a result, the execution of long-running optimizations does not hinder execution of other optimizations or detection of new data portion optimizations.

During a detection phase, functions corresponding to each of several optimization types are evaluated for all data portions. If a given function evaluates to TRUE for a given data portion, it is determined to apply the optimization type associated with the given function to the given data portion. Each determined data portion optimization (i.e., specifying a data portion and an optimization type to apply to the data portion) is sent to an optimization queue, and, after a predetermined period, detection phase is re-executed.

Unlike conventional systems, the execution phase may be performed in parallel with the detection phase. During the execution phase, each of several execution threads, in parallel, acquires data portion optimizations from the optimization queue and executes the specified optimization types on the specified data portions until the optimization queue is empty or the thread is terminated. The number of execution threads may be dynamically sized after each detection phase, resulting in more-efficient resource usage.

Figure 1:
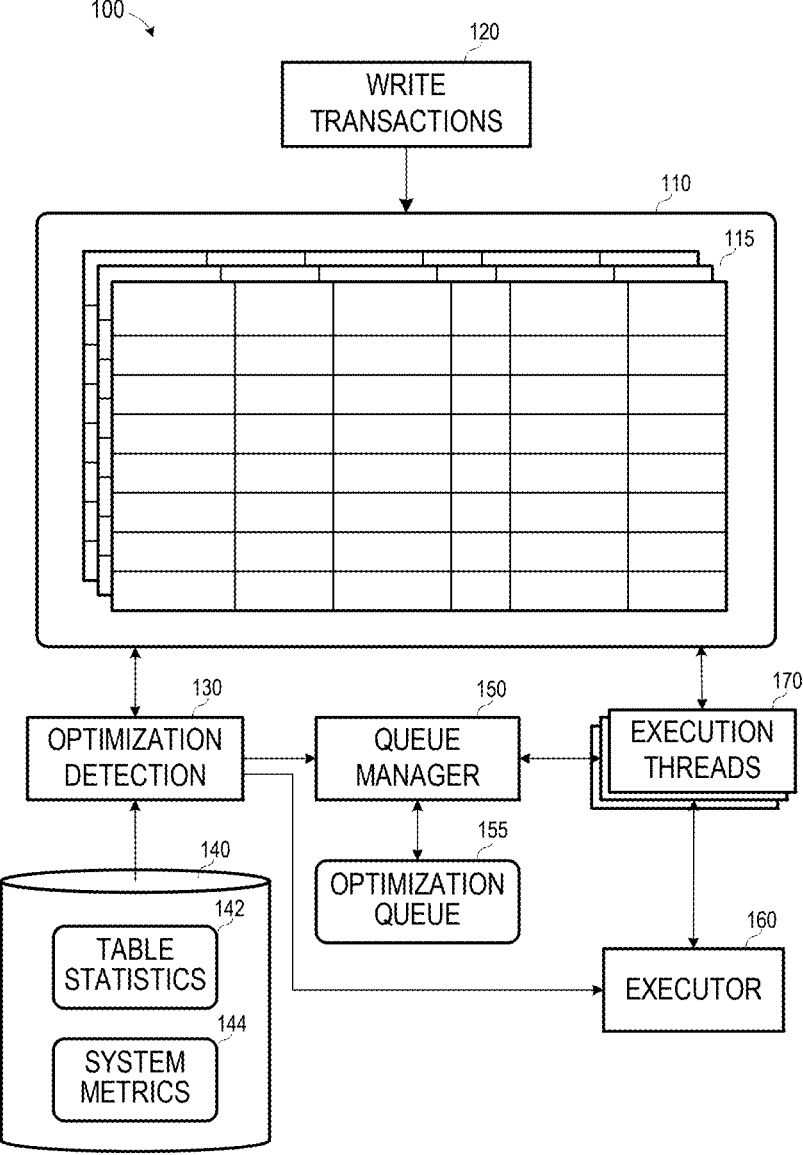
FIG. 1 is a logical block diagram of a system to execute optimizations on database table partitions at runtime according to some embodiments.

FIG. 1 is a logical block diagram of system 100 according to some embodiments. The illustrated elements of system 100 may be implemented using any suitable combination of computing hardware and/or software that is or becomes known. In some embodiments, two or more elements of system 100 are implemented by a single computing device. A cloud-based implementation of any components of system 100 may apportion computing resources elastically according to demand, need, price, and/or any other metric.

Each component may comprise, for example, comprise a single computer server, a virtual machine, or a cluster of computer servers such as a Kubernetes cluster. Kubernetes is an open-source system for automating deployment, scaling and management of containerized applications. Each component of system 100 may therefore be implemented by one or more servers (real and/or virtual) or containers. Each data storage component depicted herein may comprise one or more storage systems, each of which may be standalone or distributed, on-premise or cloud-based.

Data store 110 stores database tables 115. Data store 110 may comprise a columnar data store in which the data of each column of each of database tables 115 is stored in contiguous memory addresses as is known in the art. Each table column in a columnar data store may be logically split into a delta column fragment and a main column fragment. Delta column fragments may be optimized for read and write access in disk and in memory, while main column fragments may be optimized for read access in disk and in memory.

According to some embodiments, a main column fragment contains all the data within an associated table (or table partition) column, and is stored using a sorted dictionary (i.e., dictionary-encoded) and bit compression. The encoded and bit-compressed data of a main column fragment may also be subjected to advanced compression as described herein. A delta column fragment contains newly-written data which has not yet been merged into its corresponding main column fragment, and is stored using a non-sorted dictionary and bit compression. All new data is inserted into the delta column fragments, and the data of the main column fragments changes only during delta merges, re-compression, and other data reorganization processes.

One or more of database tables 115 may be physically partitioned (e.g., by hash, by range, etc.) into data partitions as is known in the art. For a table composed of m columns and n partitions, each column is associated with n main column fragments and n delta column fragments. Accordingly, the table is associated with m×n main column fragments and m×n delta column fragments.

During operation of system 100, write transactions 120 issue commands such as but not limited to Data Manipulation Language (DML) statements (e.g., insert, delete, update) which change the data of database tables 115. As mentioned above, the changes to a given database table 115 are applied to the delta column fragments associated with each column of the given database table 115. Received commands may result in creation of a new column, dropping of an existing column, or alteration of an existing column. New main and delta column fragments are created for any new columns, and main and delta column fragments associated with any dropped columns are logically deleted.

Optimization detection component 130 determines optimization types to be executed on data portions of database tables 115. The data portions may comprise, for example, tables, table partitions, table columns, or columns of table partitions. The optimization types may include, but are not limited to, reclaim delta, delta merge (critical variant and normal variant) and optimize compression (critical variant and normal variant) optimizations.

Execution of a reclaim delta optimization on a column deletes rows having duplicate keys from a delta column fragment associated with the column. Execution of a delta merge optimization on a column merges the delta column fragment of the column with the main column fragment of the column to create a new main column fragment, and also creates a new empty delta column fragment. An optimize compression operation determines a compression algorithm to be applied to a main column fragment and then applies the determined compression algorithm. The column data to which the determined compression algorithm is applied may be already dictionary-encoded and bit-compressed as is known in the art of columnar data structures.

Each optimization type may be associated with a respective cost function, which may be defined by a provider of system 100 and/or users thereof. A cost function may be based on one or more table statistics, e.g., a number of changed rows since a last optimization, a total number of rows, column cardinalities, table size. Accordingly, optimization detection component 130 may access table statistics 142 of data store 140 to evaluate the cost functions. A monitoring process (not shown) of system 100 may periodically determine and update table statistics 142 as is known in the art.

Optimization detection component 130 evaluates each cost function with respect to each data portion. If a cost function evaluates to TRUE for a given data portion, optimization detection component 130 determines to execute the optimization type associated with the cost function on the given data portion. According to some embodiments, the evaluation of cost functions for a given data portion terminates once one of the cost functions evaluates to TRUE for the given data portion. Consequently, within a single detection loop, optimization detection component 130 determines at most one optimization type to be executed for each data portion.

Optimization detection component 130 transmits each optimization type determined for each data portion to queue manager 150, in the form of a data portion optimization which identifies the optimization type and a data portion on which the optimization type is to be executed.

Optimization queue 155 stores a list of data portion optimizations. Queue manager 150 manages optimization queue 155 based on the data portion optimizations received from optimization detection component 130. For example, queue manager 150 may sort optimization queue 155 based on respective priorities of the queued data portion optimizations. Priority may be determined by a function of one or more of data portion size, optimization type, data portion optimization timestamp, etc. The relative priorities of the optimization types, arranged in descending order, are reclaim delta, delta merge (normal), delta merge (critical), optimize compression (normal), and optimize compression (critical). The priority function may be specified by a provider of system 100, a user thereof, or otherwise.

In some examples, queue manager 150 determines to delete a data portion optimization from queue 155 and add a newly-received data portion optimization to queue 155 if the newly-received data portion optimization is associated with the same data portion as the queued data portion optimization and has a higher priority than the queued data portion optimization. Moreover, if a newly-received data portion optimization is associated with the same data portion as a queued data portion optimization but the priority of the queued data portion optimization is higher than the priority of the newly-received data portion, queue manager 150 may ignore the newly-received data portion optimization (i.e., not add the newly-received data portion optimization to optimization queue 155). In some embodiments, queue manager 150 deletes a queued data portion optimization from optimization queue 155 if optimization detection component 130 determines that the data portion optimization is no longer needed (and if the data portion optimization is not already in progress).

Executor 160 instantiates one or more execution threads 170. In parallel with the above-described operation of components 130 and 150, each instantiated thread 170 acquires data portion optimizations from optimization queue 155 and executes the specified optimization types on specified data portions. For example, a thread 170 identifies a highest-priority pending data portion optimization of optimization queue 155, marks the data portion optimization as "in-progress", executes the optimization type specified by the data portion optimization on the data portion specified by the data portion optimization, removes the data portion optimization from optimization queue 155, and repeats these actions until optimization queue 155 is empty or the thread is terminated.

According to some embodiments, optimization detection component 130 instructs executor 160 to maintain a particular number of execution threads 170. If the particular number of threads 170 is less than the current number of instantiated threads 170, one or more of the current threads 170 are terminated after executing their current data portion optimization.

Optimization detection component 130 may determine the particular number of threads based on system metrics 144 of data store 140. System metrics 144 may indicate a past, current and/or projected future load on system 100. The load may be determined based on any one or more metrics, including but not limited to the size of optimization queue 155, the amount of free CPU, and the amount of free memory. Optimization detection component 130 may determine the particular number of execution threads 170 and instruct executor 160 at any suitable point of operation, such as after each detection phase.

Figure 2:
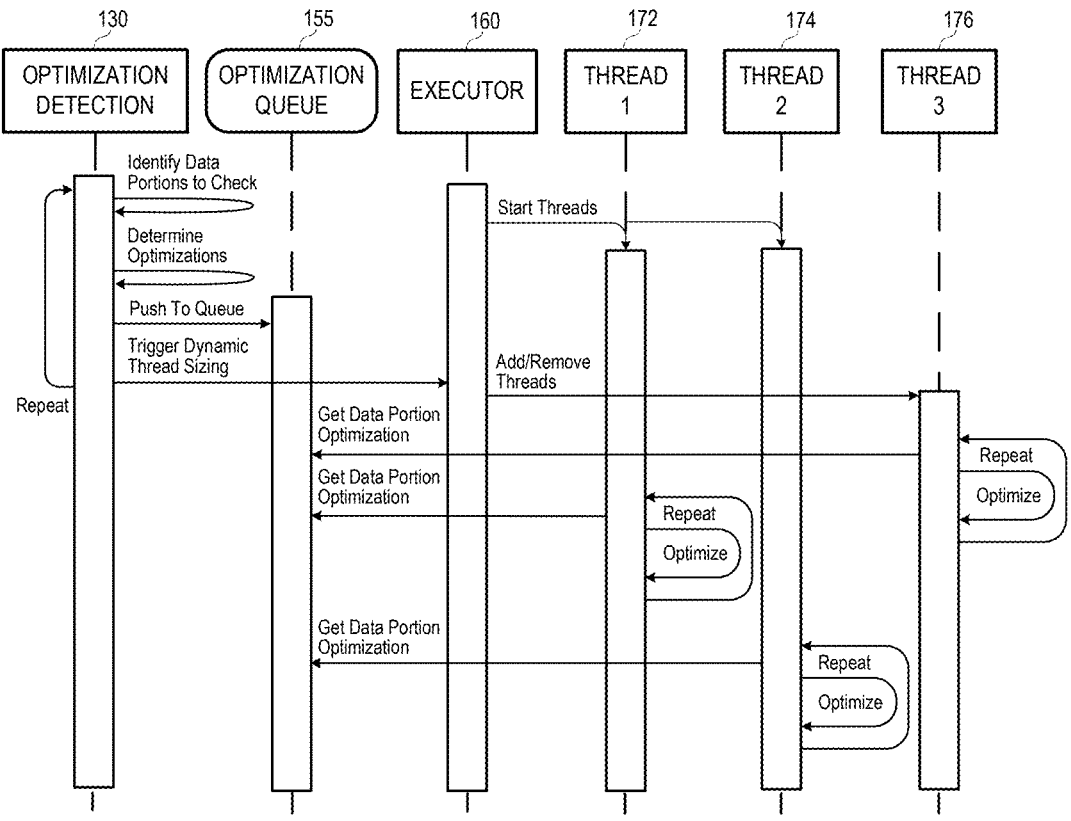
FIG. 2 is a sequence diagram illustrating execution of optimizations on database table partitions at runtime according to some embodiments.

FIG. 2 comprises a sequence diagram illustrating execution of optimizations on database table partitions at runtime according to some embodiments. In some embodiments, various hardware elements execute program code to perform the illustrated sequence. All processes described herein may be executed by a database system using any suitable combination of hardware and software. Software program code embodying these processes may be stored by any non-transitory tangible medium, including a fixed disk, a volatile or non-volatile random-access memory, a DVD, a Flash drive, and a magnetic tape, and executed by any suitable processing unit, including but not limited to one or more programmable microprocessors, microcontrollers, processing cores, and processor threads. Embodiments are not limited to the examples described below.

Initially, optimization component 130 identifies data portions to be checked. Each identified data portion may comprise a column of a table partition of a database system. Next, as described above, component 130 determines zero or one optimization types to be executed on each identified data portion. A data portion optimization is generated for each optimization type to be executed, and the generated data portion optimizations are pushed to optimization queue 155.

FIG. 3 is a tabular representation of optimization queue 155 according to some embodiments. Each row of queue 155 corresponds to a data portion optimization. In the illustrated example, each data portion optimization of queue 155 identifies a data portion, an optimization type to be applied to the data portion, a size of the data portion, a timestamp indicating a time at which the data portion optimization was saved to queue 155 and a status of the data portion optimization. Embodiments are not limited to the fields of FIG. 3.

Queue 155 of FIG. 3 is sorted according to data portion size, but embodiments are not limited thereto. Queue 155 may be sorted by priority, in which the priority of a data portion optimization is determined based on the optimization type and the data portion size, for example. The status of each data portion optimization may be changed from "Queued" to "In-Progress" by an execution thread as will be described below.

Figure 4:
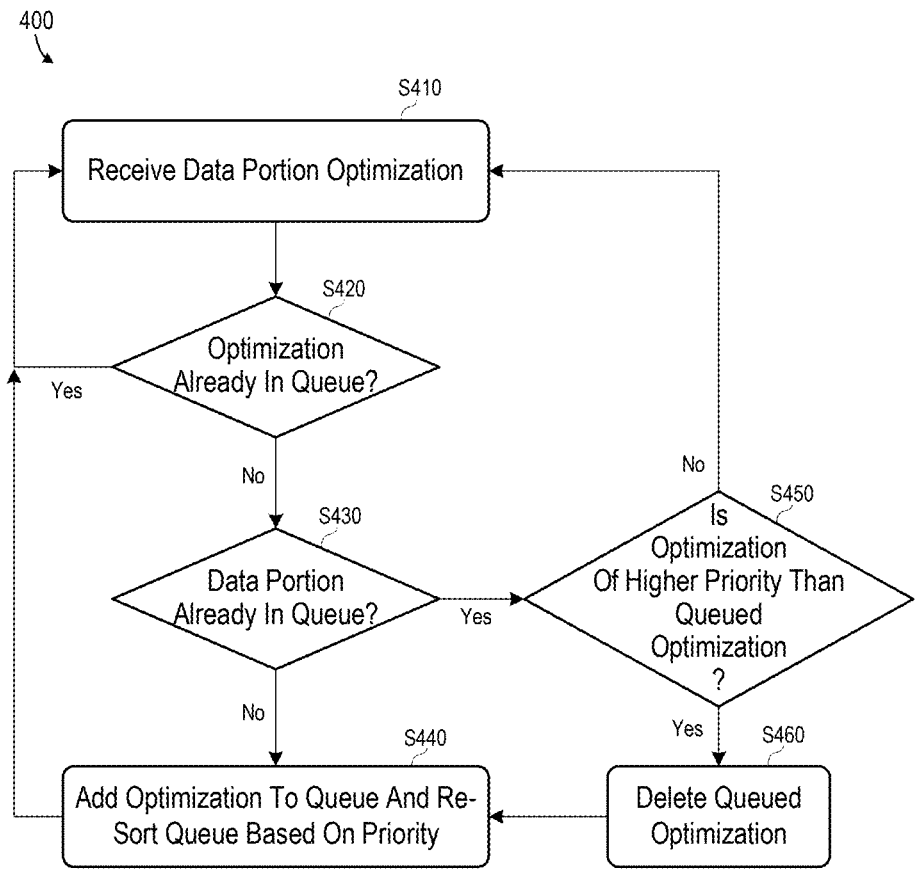
FIG. 4 is a flow diagram of a process to add detected data portion optimizations to an optimization queue according to some embodiments.

FIG. 4 is a flow diagram of process 400 to add detected data portion optimizations to an optimization queue according to some embodiments. Process 400 may be executed by queue manager 150 according to some embodiments. At S410, a data portion optimization is received from optimization detection component 130. As described above, the received data portion optimization may be one of a batch of data portion optimizations received from component 130 after component 130 executes a check of all data portions.

At S420, it is determined whether the data portion optimization is already within the optimization queue. With reference to FIG. 3, if an existing row of queue 155 specifies the same data portion and same optimization type as the received data portion optimization, flow returns to S410 to receive a next data portion optimization (e.g., a next data portion optimization of the received batch). Flow proceeds to S430 if the determination at S420 is negative.

At S430, it is determined whether the data portion of the received data portion optimization is currently represented in the queue. S430 may comprise determining whether an existing row of queue 155 specifies the same data portion as the data portion optimization received at S410. If not, the data portion optimization is added to the queue at S440. In some embodiments, the queue is re-sorted based on the priorities of the data portion optimizations stored therein. The re-sorting at S440 may require re-calculation of the priority of each queued data portion optimization.

Flow proceeds from S430 to S450 if it is determined that an existing row of queue 155 specifies the same data portion as the data portion optimization received at S410. At S450, it is determined whether a priority of the received data portion optimization is higher than a priority of the queued data portion optimization which specifies the same data portion. If not, flow returns to S410, i.e., the received data portion optimization is ignored and the queue remains unchanged. If not, the queued data portion optimization is deleted and flow proceeds to S440 to add the received data portion optimization to the queue and re-sort the queue.

As an example of S450, if the optimization type of the received data portion optimization is "Optimize Compression" and the optimization type of the queued data portion optimization is "Reclaim Delta", it may be determined at S450 that the priority of the received data portion optimization is not higher than a priority of the queued data portion optimization, and the received data portion optimization is ignored. In another example, the optimization type of the received data portion optimization is "Delta Merge" and the optimization type of the queued data portion optimization is "Optimize Compression", and it is determined at S450 that the priority of the received data portion optimization is higher than a priority of the queued data portion optimization. Accordingly, the queued data portion optimization is deleted from the queue and the received data portion optimization is added to the queue.

In yet another example, the optimization type of the received data portion optimization is "Delta Merge" and the optimization type of the queued data portion optimization is "Optimize Compression". However, the timestamp associated with the queued data portion optimization indicates that this data portion optimization has been queued for a long time. Accordingly, it is determined at S450 that the priority of the received data portion optimization is not higher than a priority of the queued data portion optimization and the received data portion optimization is ignored.

Returning to FIG. 2, optimization detection component 130 may also determine a number of threads to be used to execute optimizations. This determination may be based on available resources, a size of queue 155, etc. Component 130 calls executor 160 to specify the determined number of threads.

Executor 160 may initially instantiate execution threads 172 and 174 by default. In the example of FIG. 2, component 130 has instructed executor 160 to instantiate three threads to execute optimizations. In response, executor 160 instantiates thread 176.

Each instantiated thread 172, 174 and 176 may perform a same process. In particular, each thread fetches a currently highest-priority and not in-progress data portion optimization from optimization queue 155, changes the status of the data portion optimization in the queue to in-progress, and executes the specified optimization type specified by the data portion optimization on the data portion specified by the data portion optimization. After successfully completing the execution, the thread removes the data portion optimization from optimization queue 155, fetches a currently highest-priority and not in-progress data portion optimization and repeats these actions until optimization queue 155 is empty or the thread is terminated.

As illustrated, optimization detection component 130 repeats the detection phase while threads 172, 174 and 176 continue to execute optimizations and independent of the executions. After each detection phase, component 130 may also instruct executor 160 to add or to remove threads as described above. The foregoing features advantageously provide data portion optimization which is more timely than provided by conventional systems and an increased ability to manage efficient resource consumption.

Figure 5:
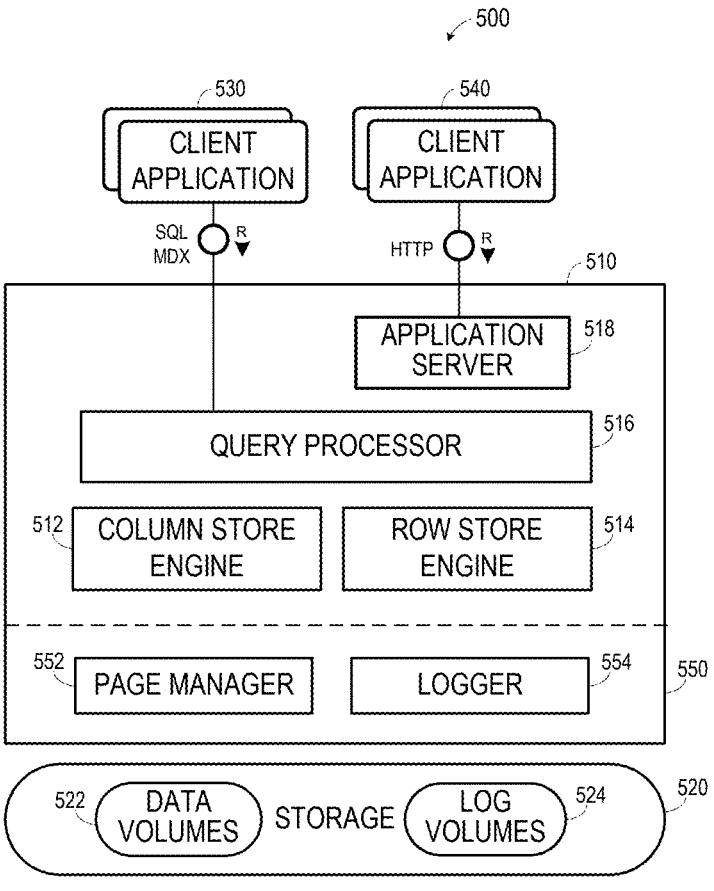
FIG. 5 is a block diagram of a database architecture according to some embodiments.

FIG. 5 is a block diagram of an implementation of database architecture 500 according to some embodiments. Embodiments are not limited to the illustrated elements of FIG. 5. The illustrated elements may be implemented by any suitable combinations of hardware and software as is known in the art. Such combinations may include one or more processing units (microprocessors, central processing units, microprocessor cores, execution threads), one or more non-transitory storage media, and processor-executable program code.

Database system 510 may comprise any query-responsive database system that is or becomes known, including but not limited to a structured-query language (i.e., SQL) relational database management system. Database system 510 may comprise an "in-memory" database, in which volatile Random Access Memory is used as a cache and for storing all the database tables of the database during operation.

Database system 510 includes column store engine 512. Column store engine 512 manages tabular data of a database as is known in the art. According to some embodiments, column store engine 512 includes in-memory representations of delta column fragments and main column fragments. New main column fragments are constructed by column store engine 512, persisted to data volumes 522 of storage 520, and read therefrom by column store engine 512.

Column store engine 512 may implement the processes described herein upon columnar table partitions. Data managed by column store engine 512 or by row store engine 514 may be retrieved or modified in response to requests received from query processor 516. Query processor 516, in turn, may receive queries received from applications executing on application server 518 and in communication with client applications 540, or directly from client applications 530.

Persistence layer 550 include page manager 552 to control storage 520 for writing to and reading from data volumes 522 and log volumes 524 stored thereon. Storage 520 may comprise one or more non-volatile data storage units (e.g., fixed disks) storing relational data, multi-dimensional data, or any other structured and/or unstructured data.

Although system 510 reflects a "single node" database system, embodiments may also be implemented within one or more nodes of a distributed database, each of which comprises an executing process, a cache and a datastore. The data stored in the datastores of each node, taken together, represent the full database, and the database server processes of each node operate to transparently provide the data of the full database to the aforementioned database applications. System 510 may also or alternatively support multi-tenancy by providing multiple logical database systems which are programmatically isolated from one another.

Figure 6:
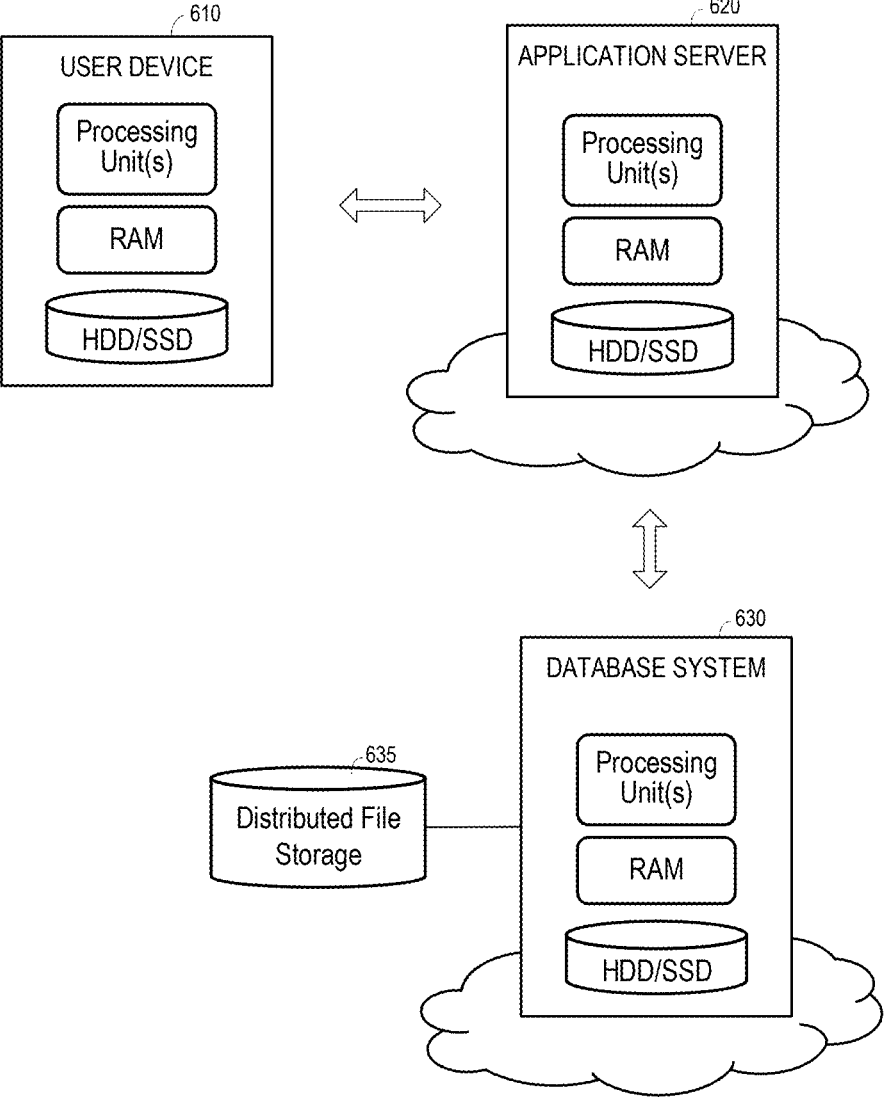
FIG. 6 is a block diagram of a cloud-based database architecture according to some embodiments.

FIG. 6 illustrates a cloud-based database deployment according to some embodiments. The illustrated components may reside in one or more public clouds providing self-service and immediate provisioning, autoscaling, security, compliance and identity management features.

User device 610 may interact with applications executing on application server 620, for example via a Web Browser executing on user device 610, in order to create, read, update and delete data managed by database system 630 and persisted in distributed file storage 635. Database system 630 may store data and may processes as described herein to optimize the stored data. Application server 620 and/or database system 630 may comprise cloud-based compute resources, such as virtual machines, allocated by a public cloud provider. As such, application server 620 and database system 630 may exhibit demand-based elasticity.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of system 100 may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid-state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
   a memory storing executable program code; and
   one or more processing units to execute the executable program code to cause the system to:
   determine plurality of data portion optimizations, each of the first plurality of data portion optimizations indicating a first data portion and a first optimization;
   transmit the first plurality of data portion optimizations to an optimization queue;
   execute each of a plurality of threads to retrieve a respective data portion optimizations from the optimization queue and execute the optimization indicated by the retrieved respective data portion optimizations on the data portion indicated by the retrieved respective data portion optimization;
   while at least one of the plurality of threads is executing the indicated optimization:
   determine a second plurality of data portion optimizations, each of the second plurality of data portion optimizations indicating a second data portion and a second optimization; and
   transmit the second plurality of data portion optimizations to the optimization queue; and
   continue to execute the plurality of threads to retrieve the second plurality of data portion optimizations from the optimization queue and execute the second optimizations on the second data portions.

2. The system of claim 1, wherein transmission of the first plurality of data portion optimizations to the optimization queue comprises transmission of a third optimization of a third data portion and a fourth optimization of the third data portion:
   the one or more processing units to execute the executable program code to cause the system to:
   determine that a priority of the third optimization is higher than a priority of the fourth optimization; and in response to the determination that the priority of the third optimization is higher than the priority of the fourth optimization, add the third optimization to the optimization queue and do not add the fourth optimization to the optimization queue.

3. The system of claim 2, wherein transmission of the second plurality of data portion optimizations to the optimization queue comprises transmission of a fifth optimization of the third data portion:

the one or more processing units to execute the executable program code to cause the system to:

determine that a priority of the fifth optimization is higher than a priority of the third optimization; and in response to the determination that the priority of the fifth optimization is higher than the priority of the third optimization, delete the third optimization from the optimization queue and add the fifth optimization to the optimization queue.

4. The system of claim 1, wherein transmission of the first plurality of data portion optimizations to the optimization queue comprises transmission of an optimize compression optimization of a third data portion and wherein transmission of the second plurality of data portion optimizations to the optimization queue comprises transmission of a delta merge optimization of the third data portion:

the one or more processing units to execute the executable program code to cause the system to:

determine that a priority of the optimize compression optimization of the third data portion is higher than a priority of the delta merge optimization of the third data portion based on a timestamp of the optimize compression optimization of the third data portion in the optimization queue; and in response to the determination that the priority of the optimize compression optimization of the third data portion is higher than the priority of the delta merge optimization of the third data portion, do not add the delta merge optimization of the third data portion to the optimization queue.

5. The system of claim 1, wherein transmission of the first plurality of data portion optimizations to the optimization queue comprises transmission of a third optimization of a third data portion and wherein transmission of the second plurality of data portion optimizations to the optimization queue comprises transmission of a fourth optimization of the third data portion:

the one or more processing units to execute the executable program code to cause the system to:

determine that a priority of the fourth optimization is higher than a priority of the third optimization; and in response to the determination that the priority of the fourth optimization is higher than the priority of the third optimization, delete the third optimization of the third data portion from the optimization queue and add the fourth optimization of the third data portion to the optimization queue.

6. The system of claim 5, wherein the fourth optimization comprises a delta merge, and wherein the third optimization comprises a compression optimization.

7. The system of claim 1, wherein the first plurality of data portion optimizations include a third optimization of a third data portion and wherein the second plurality of data portion optimizations include the third optimization of the third data portion:

the one or more processing units to execute the executable program code to cause the system to:

in response to the transmission of the second plurality of data portion optimizations, determine that the optimization queue includes the third optimization of the third data portion; and in response to the determination that the optimization queue includes the third optimization of the third data portion, do not add the third optimization of the third data portion to the optimization queue.

8. The system of claim 1, the one or more processing units to execute the executable program code to cause the system to:

determine a number of threads based on performance-related metric values associated with the system; and modify the number of the plurality of threads based on the determined number.

9. A method comprising:

determining a first plurality of data portion optimizations, each of the first plurality of data portion optimizations indicating a first data portion and a first optimization;

transmitting the first plurality of data portion optimizations to an optimization queue;

executing each of a plurality of threads to retrieve a respective data portion optimization from the optimization queue and execute the optimization indicated by the retrieved respective data portion optimization on the data portion indicated by the retrieved respective data portion optimization;

while at least one of the plurality of threads is executing the indicated optimizations:

determining a second plurality of data portion optimizations, each of the second plurality of data portion optimizations indicating a second data portion and a second optimization; and transmitting the second plurality of data portion optimizations to the optimization queue; and continuing to execute the plurality of threads to retrieve the second plurality of data portion optimizations from the optimization queue and execute the second optimizations on the second data portions.

10. The method of claim 9, wherein transmitting the first plurality of data portion optimizations to the optimization queue comprises transmitting a third optimization of a third data portion and a fourth optimization of the third data portion, the method further comprising:

determining that a priority of the third optimization is higher than a priority of the fourth optimization; and in response to determining that the priority of the third optimization is higher than the priority of the fourth optimization, adding the third optimization to the optimization queue and not adding the fourth optimization to the optimization queue.

11. The method of claim 10, wherein transmitting the second plurality of data portion optimizations to the optimization queue comprises transmitting a fifth optimization of the third data portion, the method further comprising:

determining that a priority of the fifth optimization is higher than a priority of the third optimization; and in response to determining that the priority of the fifth optimization is higher than the priority of the third optimization, deleting the third optimization from the optimization queue and adding the fifth optimization to the optimization queue.

12. The method of claim 9, wherein transmitting the first plurality of data portion optimizations to the optimization queue comprises transmitting an optimize compression optimization of a third data portion and wherein transmitting the second plurality of data portion optimizations to the optimization queue comprises transmitting a delta merge optimization of the third data portion, the method further comprising:

determining that a priority of the optimize compression optimization of the third data portion is higher than a priority of the delta merge optimization of the third data portion based on a timestamp of the optimize compression optimization of the third data portion in the optimization queue; and in response to determining that the priority of the optimize compression optimization of the third data portion is higher than the priority of the delta merge optimization of the first data portion, not adding the delta merge optimization of the third data portion to the optimization queue.

13. The method of claim 9, wherein transmitting the first plurality of data portion optimizations to the optimization queue comprises transmitting a third optimization of a third data portion and wherein transmitting the second plurality of data portion optimizations to the optimization queue comprises transmitting a fourth optimization of the third data portion, the method further comprising:

determining that a priority of the fourth optimization is higher than a priority of the third optimization; and in response to determining that the priority of the fourth optimization is higher than the priority of the third optimization, deleting the third optimization of the third data portion from the optimization queue and adding the fourth optimization of the third data portion to the optimization queue.

14. The method of claim 13, wherein the fourth optimization comprises a delta merge, and wherein the third optimization comprises a compression optimization.

15. The method of claim 9, wherein the first plurality of data portion optimizations include a third optimization of a first third data portion and wherein the second plurality of data portion optimizations include the third optimization of the third data portion, the method further comprising:

in response to transmitting the second plurality of data portion optimizations, determining that the optimization queue includes the third data portion optimization of the third data portion; and in response to determining that the optimization queue includes the third optimization of the third data portion, not adding the third optimization of the third data portion to the optimization queue.

16. One or more non-transitory computer-readable media storing program code, the program code executable by a computing system to cause to the computing system to:

determine a first plurality of data portion optimizations, each of the first plurality of data portion optimizations indicating a first data portion and a first optimization;

transmit the first plurality of data portion optimizations to an optimization queue;

execute each of a plurality of threads to retrieve a respective data portion optimizations from the optimization queue and execute optimization indicated by the retrieved respective data portion optimizations on the data portion indicated by the retrieved respective data portion optimization;

while at least one of the plurality of threads is executing the indicated optimizations:

determine a second plurality of data portion optimizations, each of the second plurality of data portion optimizations indicating a second data portion and a second optimization; and transmit the second plurality of data portion optimizations to the optimization queue; and continue to execute the plurality of threads to retrieve the second plurality of data portion optimizations from the optimization queue and execute the second optimizations on the second data portions.

17. The one or more non-transitory computer-readable media of claim 16, wherein transmission of the first plurality of data portion optimizations to the optimization queue comprises transmission of a third optimization of a third data portion and a fourth optimization of the third data portion:

the program code executable by a computing system to cause to the computing system to:

determine that a priority of the third optimization is higher than a priority of the fourth optimization; and in response to the determination that the priority of the third optimization is higher than the priority of the fourth optimization, add the third optimization to the optimization queue and do not add the fourth optimization to the optimization queue.

18. The one or more non-transitory computer-readable media of claim 17, wherein transmission of the second plurality of data portion optimizations to the optimization queue comprises transmission of a fifth optimization of the third data portion:

the program code executable by a computing system to cause to the computing system to:

determine that a priority of the fifth optimization is higher than a priority of the third optimization; and in response to the determination that the priority of the fifth optimization is higher than the priority of the third optimization, delete the third optimization from the optimization queue and add the fifth optimization to the optimization queue.

19. The one or more non-transitory computer-readable media of claim 16, wherein transmission of the first plurality of data portion optimizations to the optimization queue comprises transmission of a third optimization of a third and wherein transmission of the second plurality of data portion optimizations to the optimization queue comprises transmission of a fourth optimization of the third data portion:

the program code executable by a computing system to cause to the computing system to:

determine that a priority of the fourth optimization is higher than a priority of the third optimization; and in response to the determination that the priority of the fourth optimization is higher than the priority of the third optimization, delete the third optimization from the optimization queue and add the fourth optimization to the optimization queue.

20. The one or more non-transitory computer-readable media of claim 19, wherein the fourth optimization comprises a delta merge, and wherein the third optimization comprises a compression optimization.

\* \* \* \* \*